Oct. 13, 1959 O. S. WILLIAMS ET AL 2,908,531
TRACTOR CABS
Filed Jan. 24, 1957 3 Sheets-Sheet 1
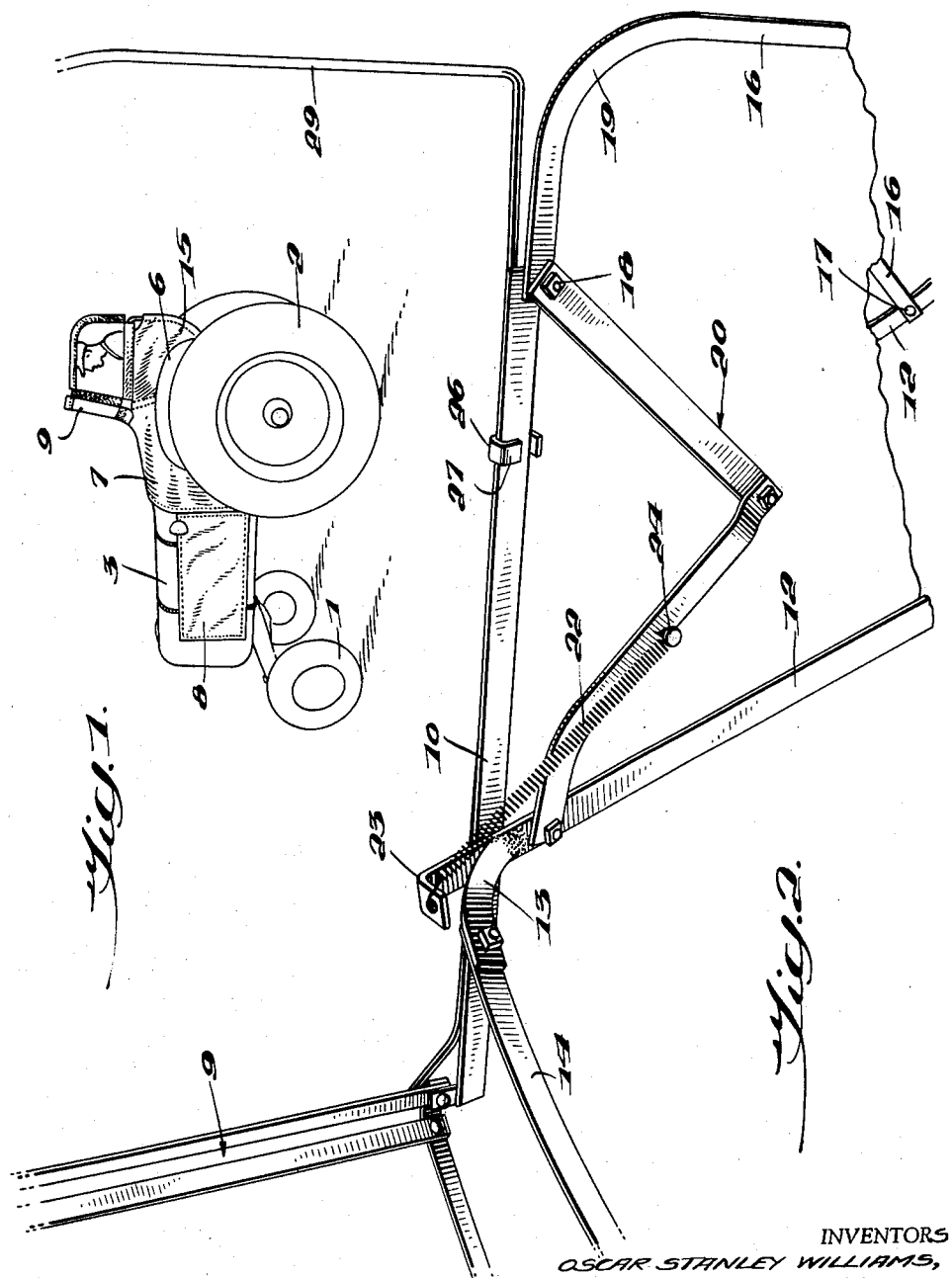
INVENTORS
OSCAR STANLEY WILLIAMS,
ROBERT S. WILLIAMS,
BY
ATTORNEYS

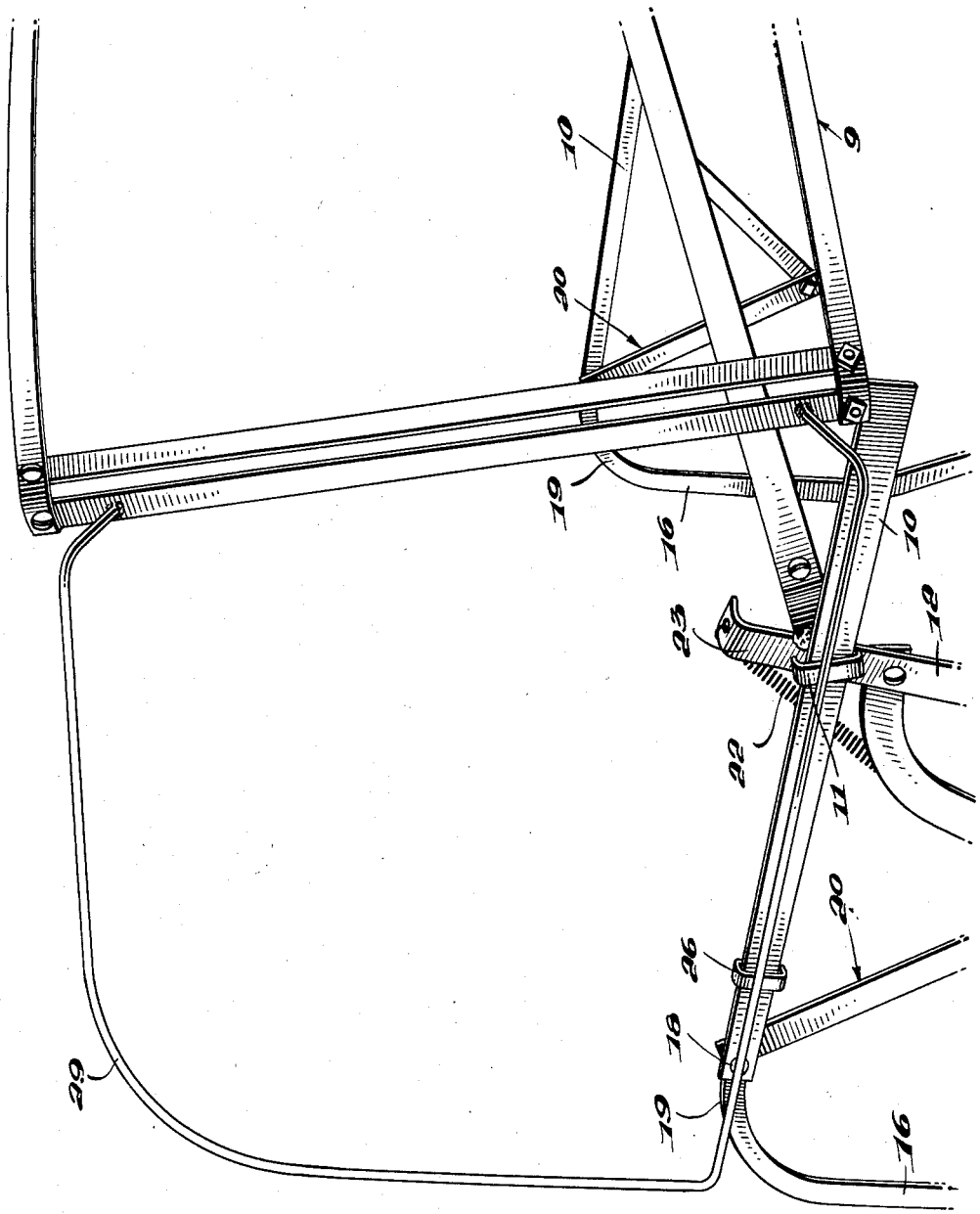

Oct. 13, 1959       O. S. WILLIAMS ET AL       2,908,531
                        TRACTOR CABS
Filed Jan. 24, 1957                        3 Sheets-Sheet 3
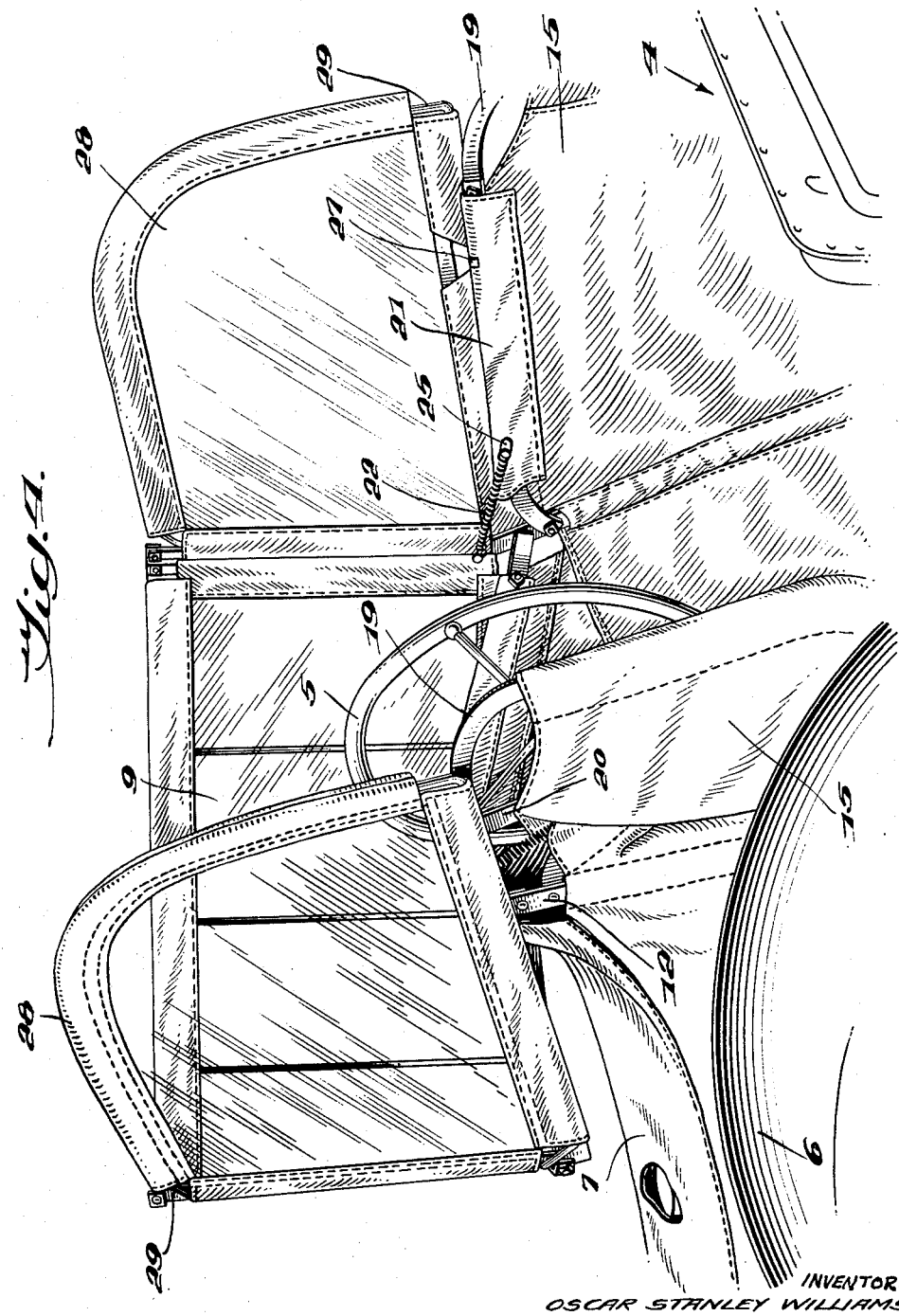
INVENTORS
OSCAR STANLEY WILLIAMS,
ROBERT S. WILLIAMS,
BY
                        ATTORNEYS

2,908,531
TRACTOR CABS

Oscar Stanley Williams and Robert S. Williams,
Arlington, Ind.

Application January 24, 1957, Serial No. 636,051

7 Claims. (Cl. 296—78)

This invention relates to improvements in tractor cabs, and more particularly to enclosures provided on tractors, such as farm tractors, around the operator's seat for protecting the driver from wind and for supplying heat thereto.

It has been customary heretofore to provide a canvas enclosure forming a cowl covering over the tractor engine and about the sides thereof and with body side wings extending rearwardly on opposite sides of the driver's space, beside the seat. A windshield usually is provided, and having windshield wings extending back over the body side wings. A fabricated metal frame supports the parts of the enclosure.

Many forms of tractors have relatively wide seats or narrow spaces between the seat and the opposite wheels or fenders thereover. This makes it difficult for the operator to get into or out from the seat.

One object of this invention is to improve the construction of such tractor cabs, and to overcome the objections to conventional constructions provided heretofore.

Another object is to provide for increasing the space between the body side wings and the seat to facilitate access of the operator to the seat and adjacent portion of the tractor.

Still another object of the invention is to provide for adjustment of the positions of the body side wings with respect to the tractor, in a collapsing action, to increase the access by the operator to the seat or adjacent portion of the tractor.

These objects may be accomplished, according to one embodiment of the invention, by providing body side wings on the cowl portion of the tractor cover, supported by an auxiliary frame that will collapse in a forward direction or folding action to positions substantially forwardly of the seat. The covering material of the body side wings is stretched when the auxiliary frame is extended and collapses when this frame is folded. Either body side wing may be collapsed separately by the operator, so as to gain access to either side of the seat.

Each side wing has the covering material thereof mounted on fixed and movable frame members, connected together for relative collapsing. The connection between these members at one edge should be through articulated, telescoping, or other type of collapsing means in a direction lengthwise of the tractor. It is preferred that the collapsing means be connected with the windshield so as to swing the windshield forward, and thereby increase the accessibility to the tractor.

This embodiment of the invention is illustrated in the accompanying drawings, in which:

Fig. 1 is a perspective view of a tractor having the improved tractor cab applied thereto;

Fig. 2 is a perspective view of the frame of one body side wing;

Fig. 3 is a similar view from the opposite side and showing the frame extended; and Fig. 4 is a perspective view of a portion of the tractor cab, showing the collapsed body side wing.

The invention is shown as applied to a tractor, such for example, as a farm tractor, which may be of the four-wheel or tricycle type. The tractor is provided with front and back wheels 1 and 2, an engine 3, and an operator's seat 4 behind and within convenient reach of a steering wheel 5 (Fig. 4). Space is provided on the tractor around the seat 4, and between the rear wheels 2, or the fenders 6 thereover, to accommodate the operator while controlling the tractor.

The tractor cab has a body portion formed of canvas, plastic, or other suitable flexible or pliable material that may be fabricated or shaped to fit the tractor. The body includes a cowl portion 7 that extends over the rear end portion of the engine 3, and down around the sides thereof. Motor flaps 8 may be provided, if needed, on opposite sides of the engine 3 and secured to the forward edges of the depending portions of the cowl 7.

A windshield is indicated generally at 9, including an upright metal frame having transparent material, usually a plastic sheet of suitable character, secured thereto. The windshield 9 is mounted in upstanding relation in front of the steering wheel 5 (Fig. 4).

The windshield 9 is supported by a pair of side bars 10 extending horizontally on opposite sides of the cab. The side bars 10 are connected at their front ends with the frame of the windshield 9, as shown in Figs. 2 and 3. These side bars 10 extend through guides 11 (Fig. 3) supported on the upper ends of standards 12.

The standards 12 are provided with brackets 13 on the inner sides thereof for supporting a cross bar 14. The rear edge of the cowl portion 7 is supported by the cross bar 14. The fabric or other material comprising the body of the cab may be secured to the metal frame parts in any desired manner, usually by pockets formed on the edges of the material by folding back the material upon itself around the cross bar.

The lower ends of the standards 12 are secured to the tractor in suitable manner, which will vary according to the make or construction of the tractor. Feet may be attached to the standards for connection with the tractor or the standards bolted directly thereto, or the like. The standards are shown as extending upwardly from the tractor in forwardly inclined relation.

Body side wings 15 are secured to the lower rear edges of the cowl portion 7 and extend backwardly therefrom on opposite sides of the seat, but between the fenders 6 over the wheels 4. These side wings 15 may be formed of the same material as the body of the cab or of other suitable flexible material, and likewise provided with pockets or other suitable means for attaching the same to the frame parts.

A frame bar 16 extends upwardly at the rear edge of each side wing 15. The lower end of each bar 16 is pivotally mounted at 17 on the lower end portion of the adjacent standard 12. The upper end portion of the frame bar 16 is pivoted at 18 to the rear end of the adjacent side bar 10. A curved portion 19 adjacent the upper edge of the side wing 15 may be exposed to form a handle for grasping to move the side wing forward or backward.

Also secured to the upper end of each frame bar 16 and extending therefrom to the upper end portion of the adjacent standard 12, is a collapsible articulated linkage 20. This linkage 20 may be of any suitable form that will collapse lengthwise, such as articulated or telescoped links pivotally connected at their outer ends to the connected frame parts. The same pivot bolt 18 may be used to attach the linkage 20 as secures the frame bar 16 to the side bar 10. The upper edge of each side wing 15 is carried by the collapsible linkage 20, extending through a pocket 21 thereon (see Fig. 4). The side bar 10 is outside the pocket and is not connected directly with the side wing 15.

The linkage 20 is held normally extended, thereby stretching the fabric of each side wing 15. A coiled spring 22 is attached at one end to a bracket, portion 23 on the upper end of the adjacent standard 12, while the other end of said spring 22 is attached to a lug 24 on the intermediate portion of the linkage 20. The lug 24 extends through an opening 25 in the pocket 21.

When the linkage 20 is articulated as shown, having sections pivoted together, a stop should be provided for its upward swinging movement. This stop is provided by a clip 26 on the side bar 10, having the upper end of said clip elongated and extending inwardly and downwardly in an overhanging stop over the linkage 20, as indicated at 27. This portion 27 should embrace the linkage 20 in the pocket 21, as shown in Fig. 4.

The windshield 9 may be provided also with side wings 28, if desired. The windshield wings 28 are also formed of transparent material secured to a frame 29, as shown in Fig. 4.

Normally, during the operation of the tractor, the body wings 15 are fully extended, as shown in Fig. 1, and at the right in Fig. 2. However, when the operator desires to get onto or off the seat, he collapses the linkage 20 at one side. In the form illustrated, this is accomplished by pressing downward on the intermediate portion of the linkage on either side, and by grasping the handle portion 19, the wing is collapsed in a forward direction, as shown at the left in Fig. 4. The reverse of this will restore the wing to its normal position.

The forward shifting movement of the upper end of the frame bar 16 also shifts forward the connected side bar 10. This bar 10, being attached to the windshield 9 and the adjacent windshield wing 28, thus removing these from interference with the movement of the operator onto or off the seat.

It will be evident that a material improvement has been effected in providing more readily for access to the tractor and yet with a reduction of area of enclosure, but without increasing substantially the cost of the cab. The structure is simple, inexpensive to build, and easily installed and used. It is effective in service.

While the invention has been illustrated and described in one embodiment, it is recognized that variations and changes may be made therein, without departing from the invention as claimed.

We claim:

1. In a tractor cab, a cowl section having rearwardly extending side wings connected therewith adapted to extend on opposite sides of an operator seat on the tractor, a frame structure supporting the cowl section, frame members connected with the side wings for holding the side wings extended relative to the cowl section, means mounting the frame members for collapsing movement in a direction toward the cowl section for retracting the wings relative thereto, and articulated collapsible linkage interconnecting the frame members with the frame structure for moving said frame members, means supporting the upper edge portions of the side wings on the articulated linkage to collapse the side wings relative to the cowl section.

2. In a tractor cab, a cowl section having rearwardly extending side wings connected therewith adapted to extend on opposite sides of an operator seat on the tractor, a frame structure supporting the cowl section, said frame structure including upright members and a cross bar connecting said upright members and connected with the cowl section, upright frame bars pivotally connected with the side wings for supporting the latter, and articulated collapsible linkages connecting the frame bars with the frame members adjacent the upper end portions thereof, means supporting the upper edge portions of the side wings on the articulated linkage for collapsing the side wings relative to the cowl portion.

3. In a tractor cab, a cowl section having rearwardly extending side wings connected therewith adapted to extend on opposite sides of an operator seat on the tractor, a frame structure supporting the cowl section, said frame structure including upright members and a cross bar connecting said upright members and connected with the cowl section, upright frame bars pivotally connected with the side wings for supporting the latter, articulated collapsible linkages connecting the frame bars with the frame members adjacent the upper end portions thereof, means supporting the upper edge portions of the side wings on the articulated linkage for collapsing the side wings relative to the cowl portion, and resilient means connected with the linkages normally tending to hold the side wings in extended relation.

4. In a tractor cab, a cowl section having rearwardly extending side wings connected therewith adapted to extend on opposite sides of an operator seat on the tractor, a frame structure supporting the cowl section, said frame structure including upright members and a cross bar connecting said upright members and connected with the cowl section, upright frame bars pivotally connected with the side wings for supporting the latter, articulated collapsible linkages connecting the frame bars with the frame members adjacent the upper end portions thereof, means supporting the upper edge portions of the side wings on the articulated linkage for collapsing the side wings relative to the cowl portion, side bars connected with the upright bars and extending forwardly therefrom, and means forming slidable connections between the side bars and the upright members providing for relative movement therebetween.

5. In a tractor cab, a cowl section having rearwardly extending side wings connected therewith adapted to extend on opposite sides of an operator seat on the tractor, a frame structure supporting the cowl section, said frame structure including upright members and a cross bar connecting said upright members and connected with the cowl section, upright frame bars pivotally connected with the upright members and connected with the side wings for supporting the latter, articulated collapsible linkages connecting the frame bars with the frame members adjacent the upper end portions thereof, means supporting the upper edge portions of the side wings on the articulated linkage for collapsing the side wings relative to the cowl portion, side bars connected with the upright bars and extending forwardly therefrom, means forming slidable connections between the side bars and the upright members providing for relative movement therebetween, and a windshield supported on the side bars for movement therewith relative to the cowl portion.

6. In a tractor cab, a cowl section having rearwardly extending side wings connected therewith adapted to extend on opposite sides of an operator seat on the tractor, a frame structure supporting the cowl section, said frame structure including upright standards having a crossbar connecting the standards together, means supporting the side wings on the crossbar with the side wings extending rearwardly therefrom, upright frame bars movably connected with the standards and connected with the rear edge portions of the side wings for supporting the latter, collapsible linkages connecting the upper end portions of the upright frame bars with the standards, and means supporting the upper edge portions of the side wings on the collapsible linkages for collapsing the side wings relative to the cowl portion upon forward swinging movement of the upright frame bars.

7. In a tractor cab, a cowl section having rearwardly extending side wings connected therewith adapted to extend on opposite sides of an operator seat on the tractor, a frame structure supporting the cowl section, said frame structure including upright standards having a crossbar connecting the standards together, means supporting the side wings on the crossbar with the side wings extending rearwardly therefrom, upright frame bars movably connected with the standards and connected with the rear edge portions of the side wings for supporting the latter, collapsible linkages connecting the upper end portions of the upright frame bars with the standards, means supporting the upper edge portions of the side wings on the collapsible linkages for collapsing the side wings relative to the cowl portion upon forward swinging movement of the upright frame bars, side bars connected with the upright frame bars and extending forwardly therefrom on opposite sides of the cab, a windshield connected with the frame structure and having side wings extending along the side bars, and means connecting the side wings with the side bars.

References Cited in the file of this patent

UNITED STATES PATENTS 2,707,031   Williams _____ Apr. 26, 1955